(12) United States Patent
Trim et al.

(10) Patent No.: US 10,893,329 B1
(45) Date of Patent: Jan. 12, 2021

(54) DYNAMIC OCCLUSION OF LIVESTREAMING

(71) Applicant: International Business Machines Corporation, Armonk, NY (US)

(72) Inventors: Craig M. Trim, Ventura, CA (US); Zachary A. Silverstein, Jacksonville, FL (US); Jeremy R. Fox, Georgetown, TX (US); Cesar Augusto Rodriguez Bravo, Alajuela (CR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/558,521

(22) Filed: Sep. 3, 2019

(51) Int. Cl.
*H04N 21/454* (2011.01)
*H04N 21/2187* (2011.01)
*G06K 9/00* (2006.01)
*H04N 21/4545* (2011.01)

(52) U.S. Cl.
CPC ..... *H04N 21/4542* (2013.01); *G06K 9/00255* (2013.01); *G06K 9/00744* (2013.01); *H04N 21/2187* (2013.01); *H04N 21/45455* (2013.01)

(58) Field of Classification Search
None
See application file for complete search history.

(56) References Cited

U.S. PATENT DOCUMENTS

| 8,018,329 | B2 | 9/2011 | Morgan et al. | |
|---|---|---|---|---|
| 8,949,724 | B2* | 2/2015 | Hickman | H04L 51/12 715/753 |
| 2006/0005218 | A1* | 1/2006 | Kroeger | H04N 21/44222 725/28 |
| 2011/0153328 | A1* | 6/2011 | Lim | G10L 25/00 704/251 |
| 2013/0236070 | A1 | 9/2013 | Sliwinski | |
| 2014/0152760 | A1* | 6/2014 | Granstrom | H04N 21/2541 348/14.08 |
| 2014/0195675 | A1 | 7/2014 | Silver | |
| 2015/0109338 | A1 | 4/2015 | McKinnon et al. | |
| 2016/0253710 | A1* | 9/2016 | Publicover | G06F 16/2358 705/14.66 |
| 2016/0277802 | A1* | 9/2016 | Bernstein | H04N 21/4307 |
| 2017/0039867 | A1* | 2/2017 | Fieldman | G11B 27/031 |

(Continued)

FOREIGN PATENT DOCUMENTS

| CN | 102687539 A | 9/2012 |
|---|---|---|
| CN | 102656474 B | 4/2015 |

OTHER PUBLICATIONS

Berger, "A Semi-Automatic Method for Resolving Occlusions in Augmented Reality", Retrieved on Dec. 18, 2018, <https://members.loria.fr/MOBerger/lepetit/Occlusions/index.html>.

(Continued)

*Primary Examiner* — Fernando Alcon
(74) *Attorney, Agent, or Firm* — Sonny Z. Zhan

(57) ABSTRACT

In an approach for dynamic occlusion of a live streaming video, a processor receives and processes a live streaming video. A processor determines whether any restricted content is in the live streaming video based on a set of user rules. A processor, in response to determining one or more restricted content being in the live streaming video, applies an occlusion to the one or more restricted content in the live streaming video. A processor broadcasts the live streaming video with the occlusion.

17 Claims, 5 Drawing Sheets

(56) References Cited

U.S. PATENT DOCUMENTS

| | | | |
|---|---|---|---|
| 2017/0337652 A1 | 11/2017 | Sarin | |
| 2018/0075665 A1 | 3/2018 | Konoplev | |
| 2018/0167564 A1 | 6/2018 | Jung et al. | |
| 2018/0242043 A1* | 8/2018 | Depies | H04N 21/2187 |
| 2019/0174202 A1* | 6/2019 | Shankar | H04N 21/4781 |
| 2019/0349626 A1* | 11/2019 | Gupta | H04N 21/8126 |
| 2020/0037010 A1* | 1/2020 | Anders | H04N 21/25891 |
| 2020/0077150 A1* | 3/2020 | Fox | H04N 21/251 |

OTHER PUBLICATIONS

Glassenberg et al., "Assisted Media Filtering", Printed Jun. 20, 2019, 9 pages, <http://robots.stanford.edu/cs223b04/inter2/P19.pdf>.

Mell et al., "The NIST Definition of Cloud Computing", Recommendations of the National Institute of Standards and Technology, Special Publication 800-145, Sep. 2011, 7 pages.

* cited by examiner

DYNAMIC OCCLUSION OF LIVESTREAMING

BACKGROUND

The present disclosure relates generally to the field of live streaming, and more particularly to dynamic occlusion of live streaming.

Live streaming refers to online streaming media simultaneously recorded and broadcast in real time. It is often referred to simply as streaming, however this abbreviated term is ambiguous because streaming may refer to any media delivered and played back simultaneously without requiring a completely downloaded file. In the field of social media, the term live media refers to new media that use streaming media technologies for creating networks of live multimedia shared among people, companies and organizations.

SUMMARY

Aspects of an embodiment of the present disclosure disclose an approach for dynamic occlusion of a live streaming video. A processor receives and processes a live streaming video. A processor determines whether any restricted content is in the live streaming video based on a set of user rules. A processor, in response to determining one or more restricted content being in the live streaming video, applies an occlusion to the one or more restricted content in the live streaming video. A processor broadcasts the live streaming video with the occlusion.

DETAILED DESCRIPTION

Figure 1:
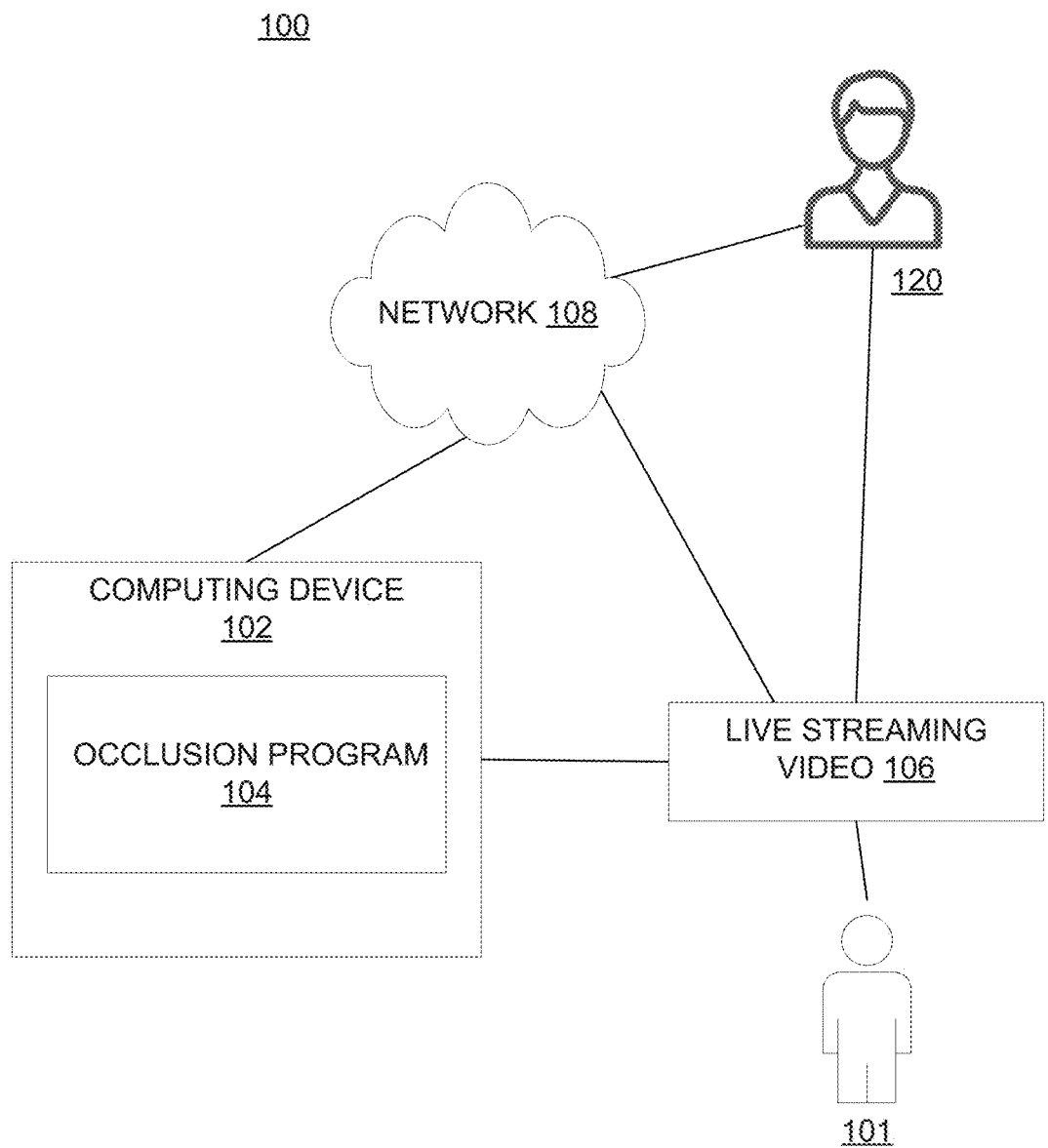
FIG. 1 is a functional block diagram illustrating a live streaming broadcast environment, in accordance with an embodiment of the present disclosure.

The present disclosure is directed to systems and methods for dynamic occlusion of a live streaming video based on the streaming content and social media connection of the broadcaster of the live streaming video.

Live streaming and augmented reality continue to grow at incredible rates. The present disclosure recognizes that live streaming sites have a need to take care of privacy. A lot of people are broadcasted without their consents. There is a risk to their privacy for broadcasting. The present disclosure recognizes a solution for privacy regulations. The present disclosure takes into consideration the audience of the streaming and applies occlusion of items, situations, texts, and people that may be inappropriate for some audiences.

The present disclosure discloses systems and methods that correlate faces of people presented on a livestreaming to detect if they can be broadcasted or obscure on the livestreaming. The systems and methods may use a buffer (e.g., less than one second) to perform the correlation before the streaming. Taking in consideration the constant growth in computing power, that buffer may become almost real time. The occlusion can be done with a technology used for image occlusion on augmented reality which is real time, making the systems and methods faster.

In an example, the occlusion can be done based on social media. The system may identify the people present on the livestream and obfuscate them based on social media circles. For examples, the system may obfuscate family from livestream, obfuscate people that are not on a user's social media network, and not obfuscate them if they are friends of friends of the user.

In another example, the occlusion can be done based on actions. The system may identify a given set of actions that are determined as non-appropriated and obscure them from the livestreaming. In another example, the occlusion can be done based on a combined occlusion including actions and social media. The occlusion can be performed based on the action displayed on the livestream plus the social relation with that person. For example, if the person performing the action is part of the social media of the broadcaster, then the system allows the streaming.

In yet another example, the occlusion may be based on viewers relationship with the broadcaster. The system may identify a given set of actions that are determined as non-appropriated and obscure them depending on the viewer social relation with the broadcaster. For example, if the viewer is on the social media connection of the broadcaster, then the system allows the streaming. If the viewer is not on the social media connection of the broadcaster, then the system obscures the action from the streaming.

The occlusion may also be based on surrounding distracting and restricted elements. The system may identify if anything distracting is appearing on the streaming and delete it from the stream. This is also useful for parental controls. The system may look for permanent or dynamic triggers for engagement or disengagement. For example, a permanent disengagement area such as a public venue is being televised like live sporting events, political events, or anything where the trigger exists to broadcast without filtering (similar to live televised events). People forgo their privacy when attending these events. A permanent engagement area is an area with high sensitivity such as places with high security or places where recording may be limited (some examples may include, but not be limited to government offices, financial institutions, and medical facilities). Dynamically trigger virtual and physical boundary engagement/disengagement may have established boundaries by static proximity, geofence, dynamic distance based on a real-time event, marked event, marked physical location, marked dynamic movement in location, path, route, (not a limiting list for triggering).

The system may recognize the people on the livestreaming and correlate them with the broadcaster's social media circles. The system will then determine (based on settings) if someone needs to be obfuscated from the livestreaming. For example, the system obfuscates people that is not on the broadcaster's social media network. The system broadcasts people that are friends of friends (FoF). In an example, the occlusion can be done by obfuscating the person or by resizing the captured video.

The system may recognize actions and correlate them against a database of restricted actions to obfuscate them from broadcasting. The value of the present disclosure is beyond privacy because it enables a type of parental control (for obscene situations), but also avoids distractors on the streaming, and makes it more attractive to the audience.

The system may capture intent of the viewers, intent of the streamer, and other rulesets the streamer may add on to their streaming tool. Possible sources to feed this intent is the viewer comments on the livestream. When the livestream identifies non-critical or restricted elements, the stream will be cropped to only the critical component or crop out the restricted element. Other embodiments could ingest a form of blurring or focal shifting. The system may also create an occlusion based on detection of inappropriate words and images.

Use cases can be correlated from the point of view of the viewer or the broadcaster to determine the actions. For example, the broadcaster may livestream to anyone without restriction, but the restricts may be applied based on the viewer. Also, the system will can be configured to apply the occlusion by over posing an image over the non-desired object, or by shrinking the area to be streamed.

The system utilizes several methods for occlusion culling. In some cases, the scene can be precomputed based on predictions of prior input. For example, if the camera is performing a panoramic sweep, the completion of a 180-degree angle may likely include the nearby occupants to the individual performing the action. If these individuals are not part of the social media connection of the broadcaster, the occlusion culling can be performed based on these pre-computed and predicted regions.

The present disclosure will now be described in detail with reference to the Figures. FIG. 1 is a functional block diagram illustrating a live streaming broadcast environment, generally designated 100, in accordance with an embodiment of the present disclosure.

In the depicted embodiment, live streaming broadcast environment 110 includes computing device 102, live streaming video 106, network 108, broadcaster 101, and viewer 120. Broadcaster 101 is usually the original creator of live streaming video 106 and decides what content to broadcast and obfuscate from live streaming video 106. Viewer 120 is usually an audience who watches live streaming video 106. Broadcaster 101 can be viewer 120 as well.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to occlusion program 104 and network 108 and is capable of processing program instructions and executing occlusion program 104, in accordance with an embodiment of the present disclosure. Computing device 102 may include internal and external hardware components, as depicted and described in further detail with respect to FIG. 3.

Further, in the depicted embodiment, computing device 102 includes occlusion program 104. In the depicted embodiment, occlusion program 104 is located on computing device 102. However, in other embodiments, occlusion program 104 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and occlusion program 104, in accordance with a desired embodiment of the disclosure.

Occlusion program 104 is configured to receive live streaming video 106 and process live streaming video 106 prior to broadcasting live streaming video 106. In general, live streaming is the broadcasting of real-time, live video to an audience. A buffer may exist for processing live streaming video 106 in a real time. In an example embodiment, the buffer between receiving and broadcasting live streaming video 106 is less than one second. Live streaming video 106 may be captured with a video camera or other suitable devices such as a mobile device with a camera by broadcaster 101. In the depicted embodiment, live streaming video 106 is located externally and may be accessed directly by computing device 102 or through a communication network such as network 108. However, in other embodiments, live streaming video 106 may be located inside computing device 102.

Occlusion program 104 may detect restricted contents in live streaming video 106 based on a set of user rules that define what contents are restricted. The set of user rules may include rules generated from parent controls, stream intents derived from previous streams, and semantic explicit filter rules. A restricted content may be a distracting object appearing on live streaming video 106. Occlusion program 104 may detect the distracting object using object recognition technology. Object recognition technology may include edge detection, edge matching, greyscale matching, gradient matching, appearance-based methods, feature-based methods, and other suitable recognition technology for identifying objects in an image or video frame.

A restricted content may be a content that is not appropriated for children, for example, inappropriate images or actions. A restricted content may be an area with high sensitivity such as a place with high security or a place where recording may be limited, for example, a government office, a financial institution, or a medical facility.

A restricted content may be a given set of actions that are determined as non-appropriated. Occlusion program 104 may recognize actions and correlate them against a database of restricted actions to obfuscate them from broadcasting. Occlusion program 104 may enable a type of the parental control, but also avoid distraction on the streaming, and make it more attractive to viewer 120. Occlusion program 104 may capture intent of viewer 120, intent of broadcaster 101, and other rulesets that broadcaster 101 may add on. Possible sources to feed this intent is the viewer 120 comments on the live streaming.

Occlusion program 104 may apply an occlusion to the restricted content in live streaming video 106. When occlusion program 104 identifies a restricted content, occlusion program 104 may crop live streaming video 106 to only a critical component or crop out the restricted content. Other embodiments for occlusion may be a form of blurring or focal shifting.

Occlusion program 104 may identify people present on live streaming video 106 and obfuscate them based on social media circles of broadcaster 101. Occlusion program 104 may identify people with a facial recognition technique. For example, occlusion program 104 may obfuscate family from live streaming video 106. In another example, occlusion program 104 may obfuscate people that are not on social media network of broadcaster 101. In another example, occlusion program 104 do not obfuscate people if they are friends of friends on social media network of broadcaster 101.

Occlusion program 104 may apply a combined occlusion based on actions and social media network. For example, occlusion program 104 may apply occlusion based on an action displayed on live streaming video 106 plus the social relation with that person. For example, if the person performing the action is a part of social media connection of broadcaster 101, then occlusion program 104 may allow the streaming.

Occlusion program 104 may apply an occlusion based on viewer 120 relationship with broadcaster 101. Broadcaster 101, for example, can be the person who takes live streaming video 106. Occlusion program 104 may identify a given set of actions that are determined as non-appropriated and obscure them depending on viewer 120 social relation with broadcaster 101. For example, if viewer 120 is on social media of broadcaster 101, then occlusion program 104 allows the streaming. If the viewer is not on a social media of broadcaster 101, then occlusion program 104 may obscure the action from the streaming.

Various use cases can be correlated from the point of view of viewer 120 or broadcaster 101 to determine the actions. For example, occlusion program 104 may allow broadcaster 101 to livestream to anyone without restriction, but the restricts are applied based on viewer 120. Also, occlusion program 104 may apply the occlusion by over posing an image over the non-desired object, or by shrinking the area to be streamed.

Occlusion program 104 may utilize various methods for occlusion culling. In some examples, a scene can be pre-computed based on predictions of prior input. For example, if the camera is performing a panoramic sweep, the completion of a 180-degree angle may likely include the nearby occupants to the individual performing the action. If these individuals are not part of social media connection of broadcaster 101, occlusion culling can be performed based on these pre-computed and predicted regions.

Figure 2:
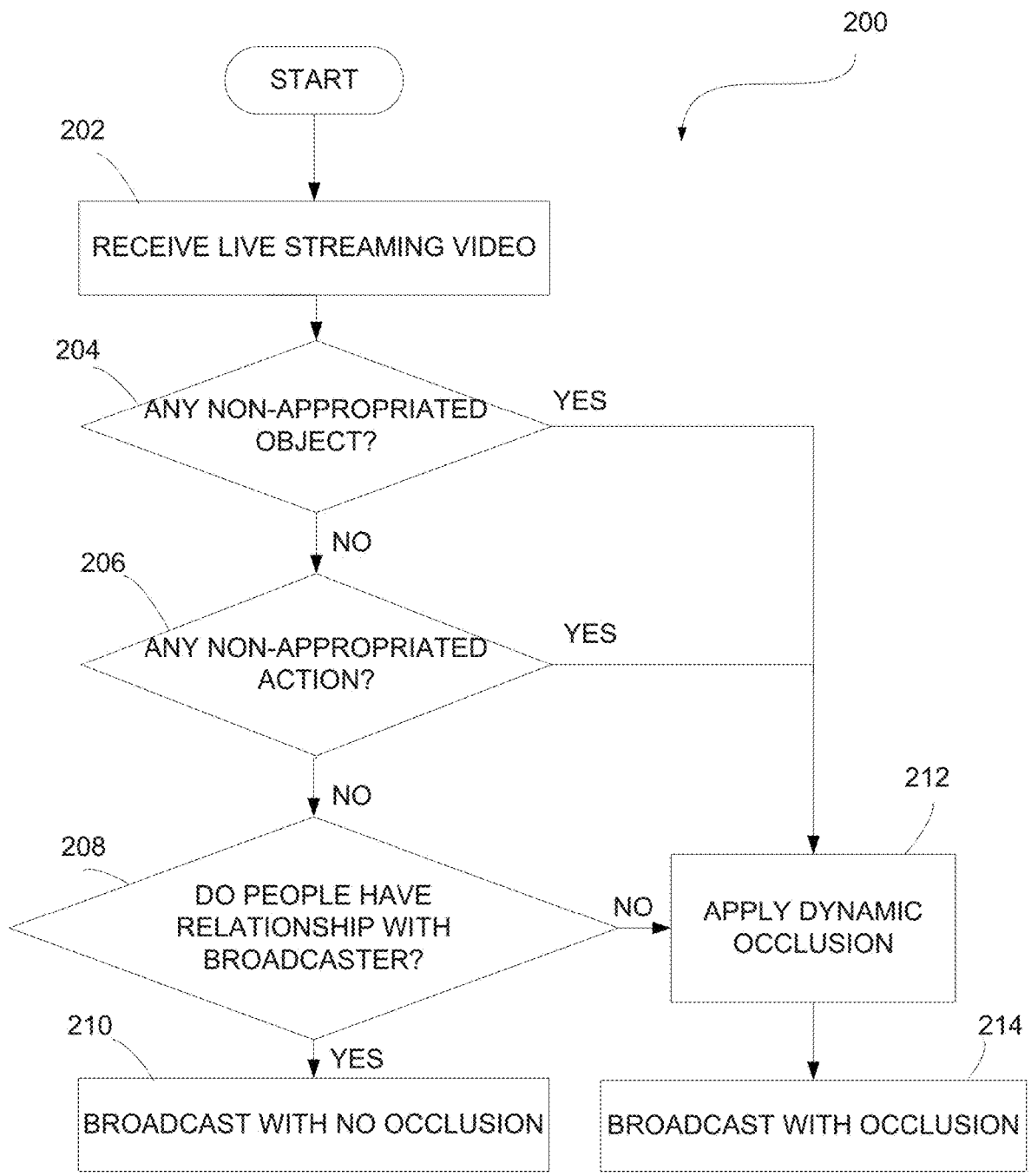
FIG. 2 is a flowchart depicting operational steps of an occlusion program 104 within a computing device of FIG. 1, in accordance with an embodiment of the present disclosure.

FIG. 2 is a flowchart 200 depicting operational steps of occlusion program 104 in accordance with an embodiment of the present disclosure.

Occlusion program 104 operates to receive and process live streaming video 106 prior to broadcasting live streaming video 106. Occlusion program 104 operates to determine whether any restricted content is in live streaming video 106 based on a set of user rules. In response to determining one or more restricted content being in live streaming video 106, occlusion program 104 operates to apply an occlusion to the one or more restricted content in live streaming video 106. Occlusion program 104 operates to broadcast live streaming video 106 with the occlusion.

In step 202, occlusion program 104 receives and processes live streaming video 106 prior to broadcasting live streaming video 106. In general, live streaming is the broadcasting of real-time, live video to an audience. A buffer may exist for processing live streaming video 106 in a real time. In an example embodiment, the buffer between receiving and broadcasting live streaming video 106 is less than one second. Live streaming video 106 may be captured with a video camera or other suitable devices such as a mobile device with a camera by broadcaster 101. Occlusion program 104 may detect restricted contents in live streaming video 106 based on a set of user rules that define what contents are restricted. The set of user rules may include rules generated from parent controls, stream intents derived from previous streams, and semantic explicit filter rules. A restricted content may be a distracting object appearing on live streaming video 106. Occlusion program 104 may detect the distracting object using object recognition technology. Object recognition technology may include edge detection, edge matching, greyscale matching, gradient matching, appearance-based methods, feature-based methods, and other suitable recognition technology for identifying objects in an image or video frame.

A restricted content may be a content that is not appropriated for children, for example, inappropriate images or actions. A restricted content may be an area with high sensitivity such as a place with high security or a place where recording may be limited, for example, a government office, a financial institution, or a medical facility.

A restricted content may be a given set of actions that are determined as non-appropriated. Occlusion program 104 may recognize actions and correlate them against a database of restricted actions to obfuscate them from broadcasting. Occlusion program 104 may enable a type of parental control, but also avoid distractors on the streaming, and make it more attractive to viewer 120. Occlusion program 104 may capture intent of viewer 120, intent of broadcaster 101, and other rulesets that broadcaster 101 may add on. Possible sources to feed this intent is viewer 120 comments on the live streaming.

Occlusion program 104 may identify people present on live streaming video 106 and obfuscate them based on social media circles of broadcaster 101. For example, occlusion program 104 may obfuscate family from live streaming video 106. In another example, occlusion program 104 may obfuscate people that are not on social media network of broadcaster 101. In another example, occlusion program 104 may not obfuscate people if they are friends of friends on social media network of broadcaster 101.

Occlusion program 104 may apply a combined occlusion based on actions and social media network. For example, occlusion program 104 may apply occlusion based on an action displayed on live streaming video 106 plus the social relation with that person. For example, if the person performing the action is a part of social media connection of broadcaster 101, then occlusion program 104 may allow the streaming.

Occlusion program 104 may apply an occlusion based on viewer 120 relationship with broadcaster 101. Broadcaster 101, for example, can be the person who takes live streaming video 106. Occlusion program 104 may identify a given set of actions that are determined as non-appropriated and obscure them depending on viewer 120 social relation with broadcaster 101. For example, if viewer 120 is on social media of broadcaster 101, then occlusion program 104 allows the streaming. If the viewer is not on a social media of broadcaster 101, then occlusion program 104 may obscure the action from the streaming.

In step 204, occlusion program 104 determines whether any non-appropriated object is in live streaming video 106. A non-appropriated object may be a distracting object appearing on live streaming video 106. A non-appropriated object may be an object that is not appropriated for children. Occlusion program 104 may detect the non-appropriated object using object recognition technology. If it is determined that a non-appropriated object is in live streaming video 106, occlusion program 104 applies an occlusion to the non-appropriated object in live streaming video 106 in step 212. Occlusion program 104 may crop out the non-appropriated object. Other embodiments for occlusion may be a form of blurring or focal shifting.

In step 206, occlusion program 104 determines whether any non-appropriated action is in live streaming video 106. Occlusion program 104 may recognize actions and correlate them against a database of restricted actions to obfuscate them from broadcasting. If it is determined that a non-appropriated action is in live streaming video 106, occlusion program 104 applies an occlusion to the non-appropriated action in live streaming video 106 in step 212.

In step 208, occlusion program 104 determines whether people in live streaming video 106 have a pre-defined relationship with broadcaster 101 based on a social media connection. If occlusion program 104 determines a person does not have a relationship with broadcaster 101, occlusion program 104 applies an occlusion to the person in live streaming video 106 in step 212.

In step 210, occlusion program 104 broadcasts live streaming video 106 without any occlusion when it is determined no restricted content in live streaming video 106 and people can be broadcasted based on the social media connection with broadcaster 101.

In step 214, occlusion program 104 broadcasts live streaming video 106 with the occlusion when occlusion program 104 determines any restricted content in live streaming video 106 or people in live streaming video 106 are not allowed to be broadcasted based on the social media connection with broadcaster 101.

Figure 3:
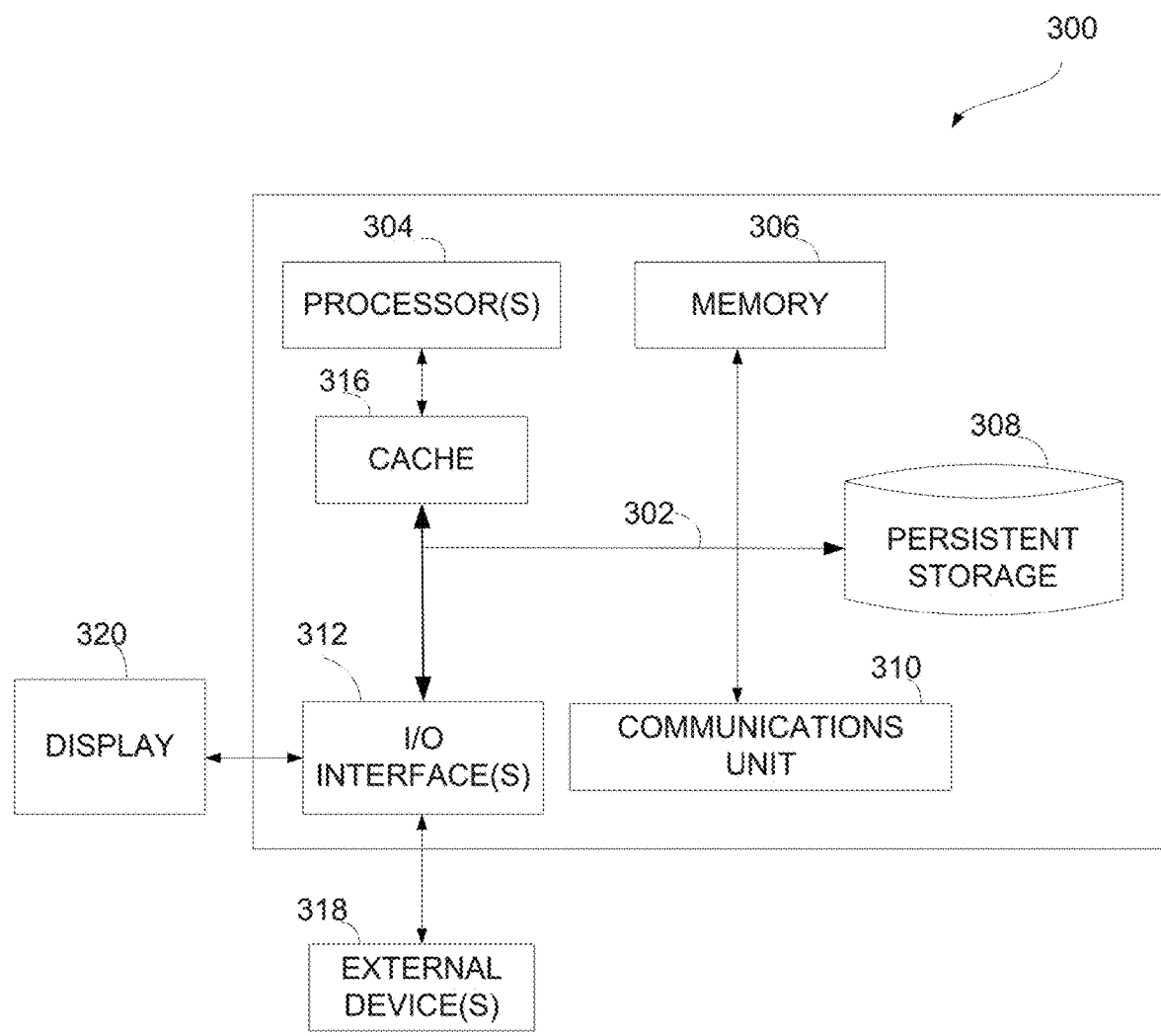
FIG. 3 is a block diagram of components of the computing device of FIG. 1, in accordance with an embodiment of the present disclosure.

FIG. 3 depicts a block diagram 300 of components of computing device 102 in accordance with an illustrative embodiment of the present disclosure. It should be appreciated that FIG. 3 provides only an illustration of one implementation and does not imply any limitations with regard to the environments in which different embodiments may be implemented. Many modifications to the depicted environment may be made.

Computing device 102 may include communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Occlusion program 104 may be stored in persistent storage 308 and in memory 306 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 408.

Communications unit 310, in these examples, provides for communications with other data processing systems or devices. In these examples, communications unit 310 includes one or more network interface cards. Communications unit 310 may provide communications through the use of either or both physical and wireless communications links. Occlusion program 104 may be downloaded to persistent storage 308 through communications unit 310.

I/O interface(s) 312 allows for input and output of data with other devices that may be connected to computing device 102. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., occlusion program 104 can be stored on such portable computer readable storage media and can be loaded onto persistent storage 308 via I/O interface(s) 312. I/O interface(s) 312 also connect to display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
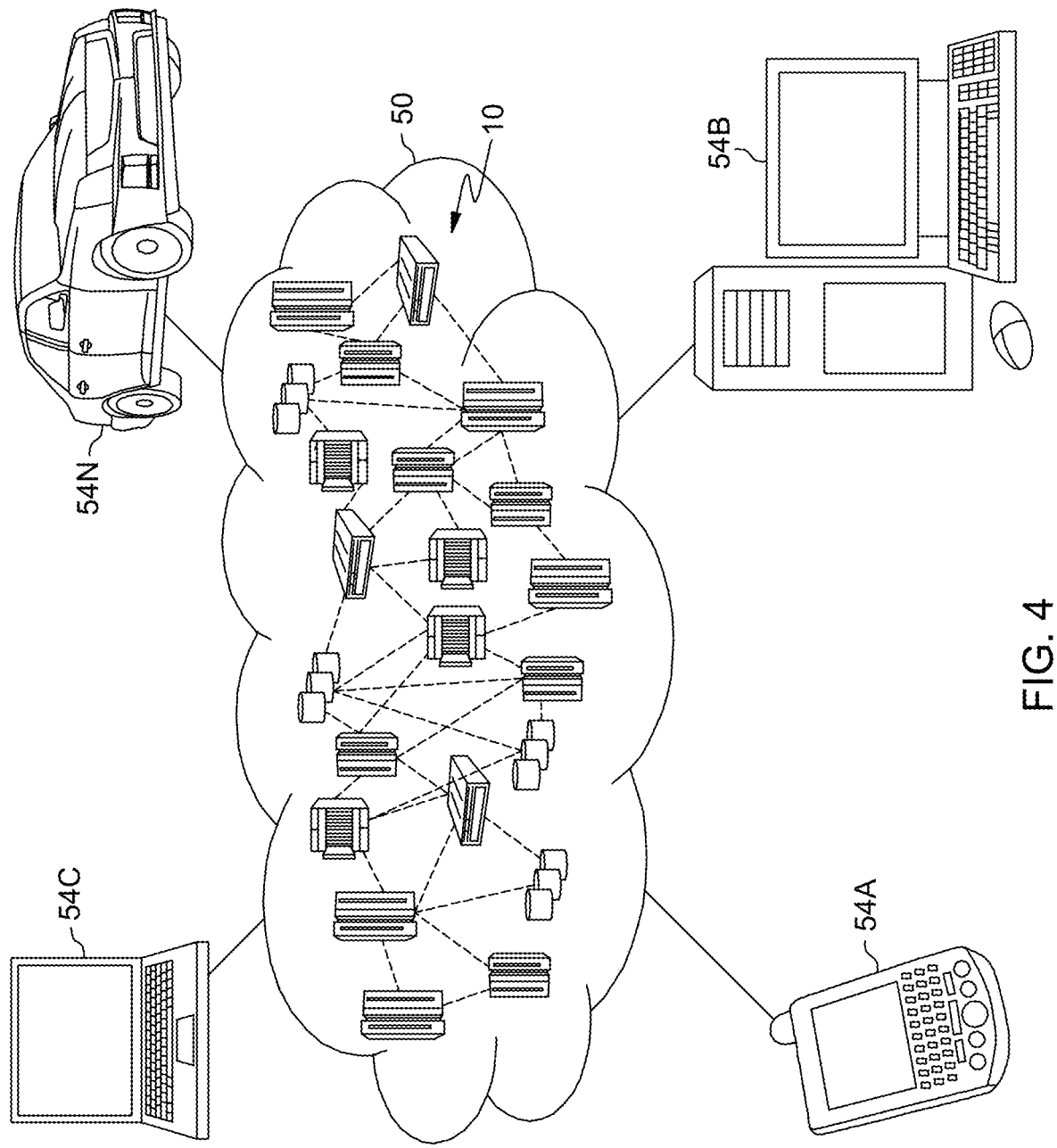
FIG. 4 depicts an embodiment of a cloud computing environment in accordance with the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
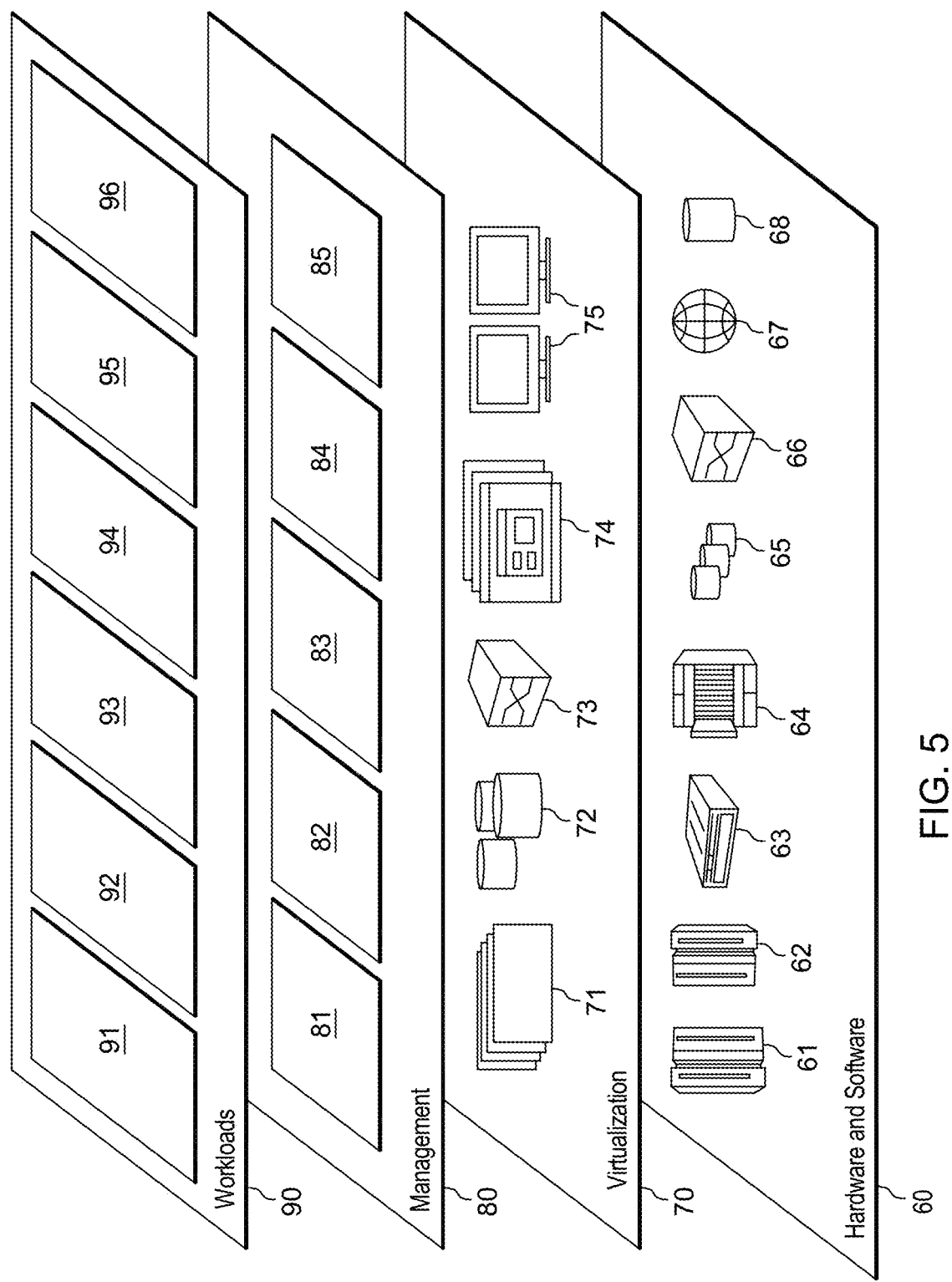
FIG. 5 depicts an embodiment of abstraction model layers of a cloud computing environment, in accordance with the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, occlusion program 104 as described above with respect to live streaming broadcast environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
processing, by one or more processors, a live streaming video;
determining, by one or more processors, that restricted content is in the live streaming video, based on a set of user rules;
in response to determining that the restricted content is in the live streaming video, applying, by one or more processors, an occlusion to the restricted content in the live streaming video;
determining, by one or more processors, that a person in the live streaming video does not have a pre-defined relationship with a viewer of the live streaming video, based on a social media connection of the viewer of the live streaming video;
in response to determining that the person in the live streaming video does not have the pre-defined relationship with the viewer of the live streaming video, applying, by one or more processors, the occlusion to the person in the live streaming video; and
broadcasting, by one or more processors, the live streaming video with the occlusion.

2. The computer-implemented method of claim 1, wherein the set of user rules includes rules based on a factor selected from the group consisting of parental controls, stream intents derived from previous streams, and semantic explicit filter rules.

3. The computer-implemented method of claim 1, wherein the restricted content is an object based on the set of user rules, the object being detected with an object recognition technique from the live streaming video.

4. The computer-implemented method of claim 1, wherein the restricted content is an action based on the set of user rules, the action being detected with an action detection technique from the live streaming video.

5. The computer-implemented method of claim 4, wherein the action detection technique is a deep learning neural network technique.

6. The computer-implemented method of claim 1, wherein the person in the live streaming video is recognized with a facial recognition technique.

7. A computer program product comprising:
one or more computer readable storage media and program instructions stored on the one or more computer readable storage media, the program instructions comprising:
program instructions to process a live streaming video;
program instructions to determine that restricted content is in the live streaming video, based on a set of user rules;
program instructions to, in response to determining that the restricted content is in the live streaming video, apply an occlusion to the restricted content in the live streaming video;
program instructions to determine that a person in the live streaming video does not have a pre-defined relationship with a viewer of the live streaming video, based on a social media connection of the viewer of the live streaming video;
program instructions to, in response to determining that the person in the live streaming video does not have the pre-defined relationship with the viewer of the live streaming video, apply the occlusion to the person in the live streaming video; and
program instructions to broadcast the live streaming video with the occlusion.

8. The computer program product of claim 7, wherein the set of user rules includes rules based on a factor selected from the group consisting of parental controls, stream intents derived from previous streams, and semantic explicit filter rules.

9. The computer program product of claim 7, wherein the restricted content is an object based on the set of user rules, the object being detected with an object recognition technique from the live streaming video.

10. The computer program product of claim 7, wherein the restricted content is an action based on the set of user rules, the action being detected with an action detection technique from the live streaming video.

11. The computer program product of claim 10, wherein the action detection technique is a deep learning neural network technique.

12. The computer program product of claim 7, wherein the person in the live streaming video is recognized with a facial recognition technique.

13. A computer system comprising:
one or more computer processors, one or more computer readable storage media, and program instructions stored on the one or more computer readable storage media for execution by at least one of the one or more computer processors, the program instructions comprising:
program instructions to process a live streaming video;
program instructions to determine that restricted content is in the live streaming video, based on a set of user rules;
program instructions to, in response to determining that the restricted content is in the live streaming video, apply an occlusion to the restricted content in the live streaming video;
program instructions, stored on the one or more computer-readable storage media, to determine that a person in the live streaming video does not have a pre-defined relationship with a viewer of the live streaming video, based on a social media connection of the viewer of the live streaming video;
program instructions, stored on the one or more computer-readable storage media, to, in response to determining that the person in the live streaming video does not have the pre-defined relationship with the viewer of the live streaming video, apply the occlusion to the person in the live streaming video; and program instructions to broadcast the live streaming video with the occlusion.

14. The computer system of claim 13, wherein the set of user rules includes rules based on a factor selected from the group consisting of parental controls, stream intents derived from previous streams, and semantic explicit filter rules.

15. The computer system of claim 13, wherein the restricted content is an object based on the set of user rules, the object being detected with an object recognition technique from the live streaming video.

16. The computer system of claim 13, wherein the restricted content is an action based on the set of user rules, the action being detected with an action detection technique from the live streaming video.

17. The computer system of claim 16, wherein the action detection technique is a deep learning neural network technique.

\* \* \* \* \*